United States Patent
Oishi et al.

(10) Patent No.: US 9,415,821 B2
(45) Date of Patent: Aug. 16, 2016

(54) ARTICLE STORAGE STRUCTURE FOR AUTOMATIC TWO-WHEELED VEHICLES

(71) Applicant: HONDA MOTOR CO., LTD., Tokyo (JP)

(72) Inventors: Kenichi Oishi, Wako (JP); Ryo Hasunuma, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/894,191

(22) PCT Filed: May 20, 2014

(86) PCT No.: PCT/JP2014/063312
§ 371 (c)(1),
(2) Date: Nov. 25, 2015

(87) PCT Pub. No.: WO2014/192588
PCT Pub. Date: Dec. 4, 2014

(65) Prior Publication Data
US 2016/0121953 A1     May 5, 2016

(30) Foreign Application Priority Data
May 31, 2013    (JP) ................................ 2013-116402

(51) Int. Cl.
*B62J 9/00*    (2006.01)
(52) U.S. Cl.
CPC ........................................ *B62J 9/003* (2013.01)
(58) Field of Classification Search
CPC ........................................................ B62J 9/003
USPC ........................................................ 280/288.4
See application file for complete search history.

(56) References Cited

U.S. PATENT DOCUMENTS

| | | | | |
|---|---|---|---|---|
| 4,426,752 A | * | 1/1984 | Nakayama | ............... E05F 3/14 16/82 |
| 4,782,978 A | * | 11/1988 | Appleby | ............... B60K 15/05 220/DIG. 33 |

(Continued)

FOREIGN PATENT DOCUMENTS

| | | |
|---|---|---|
| EP | 2 361 824 A2 | 8/2011 |
| JP | 61-17386 U | 1/1986 |

(Continued)

OTHER PUBLICATIONS

International Search Report & Written Opinion dated Jun. 24, 2014 corresponding to International Patent Application No. PCT/JP2014/063312 and English translation thereof.

*Primary Examiner* — Joseph Rocca
*Assistant Examiner* — Michael Stabley
(74) *Attorney, Agent, or Firm* — Squire Patton Boggs (US) LLP

(57) ABSTRACT

An article storage structure for an automatic two-wheeled vehicle 1 includes a cover member 20 which covers a vehicle external side, an article storage portion 30 which is disposed inside the cover in ember 20 and enables to store an article, and a lid member 31 which opens or closes an opening portion 30*a* of the article storage portion 30. A pivot 31*b* which defines a rotational axis C along an external surface 31*s* of the lid member 31 is provided in the lid member 31. A rotary damper 50 is provided on the rotational axis C and engaged with one end portion 31*be* of the pivot 31*b* so as to dampen a rotation of the lid member 31.

5 Claims, 12 Drawing Sheets

(56) References Cited

U.S. PATENT DOCUMENTS

| | | | | |
|---|---|---|---|---|
| 5,083,343 | A * | 1/1992 | Lee | E05F 3/14 16/82 |
| 5,269,397 | A * | 12/1993 | Kawamoto | B29C 65/08 16/82 |
| 5,483,396 | A * | 1/1996 | Son | G11B 15/67589 188/290 |
| 5,887,930 | A * | 3/1999 | Klein | B62D 25/12 296/37.12 |
| 6,428,075 | B2 * | 8/2002 | Kamemizu | B62H 5/00 292/210 |
| 6,851,499 | B2 * | 2/2005 | Yagisawa | B62K 19/46 180/219 |
| 7,298,241 | B2 * | 11/2007 | Konno | B62H 5/00 180/287 |
| 7,306,277 | B2 * | 12/2007 | Kamemizu | B62J 7/04 296/37.1 |
| 7,438,340 | B2 * | 10/2008 | Kurihara | B62J 17/06 296/37.1 |
| 2002/0148665 | A1 | 10/2002 | Yagisawa et al. | |
| 2007/0285272 | A1 * | 12/2007 | Umeda | B60R 25/24 340/5.31 |

FOREIGN PATENT DOCUMENTS

| | | |
|---|---|---|
| JP | 11-208551 A | 8/1999 |
| JP | 2002-284071 A | 10/2002 |
| JP | 2003-137158 A | 5/2003 |
| JP | 2006-143023 A | 6/2006 |
| JP | 4200839 B2 | 12/2008 |

* cited by examiner

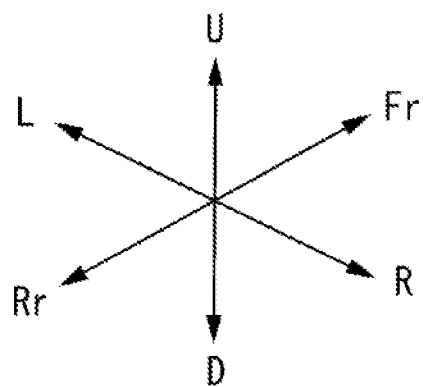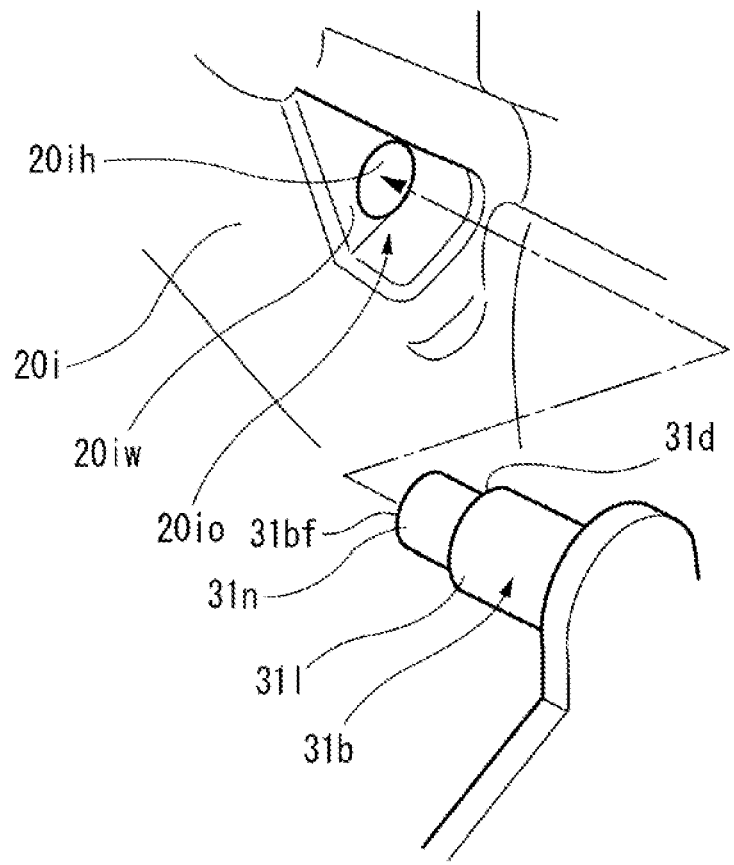
FIG.7

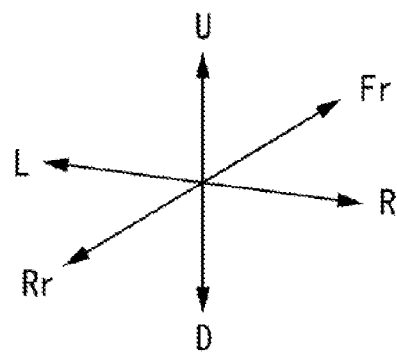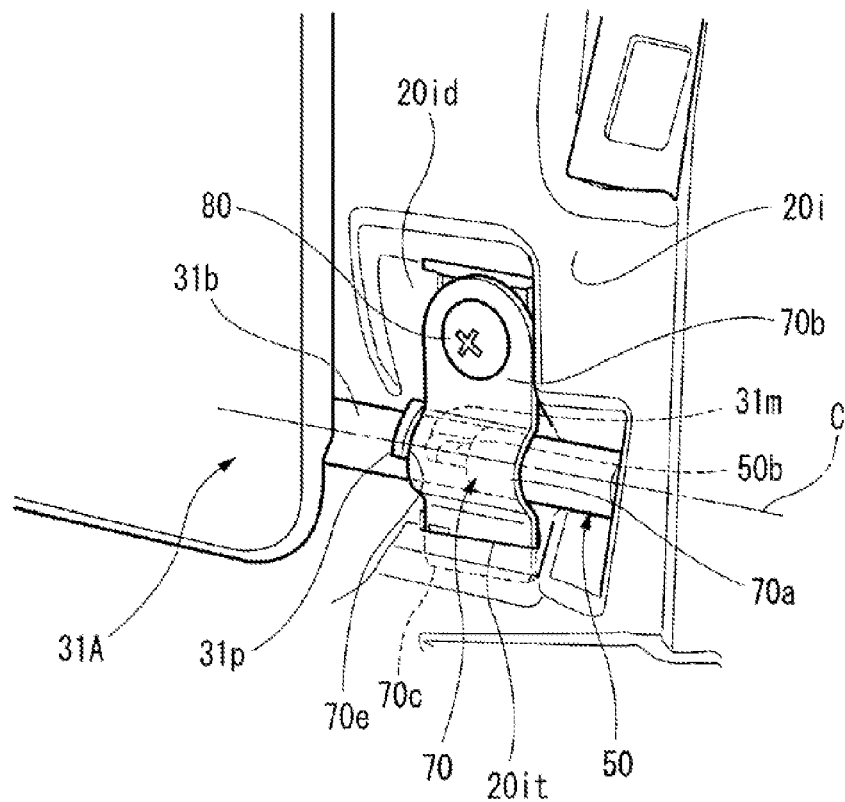
FIG.11

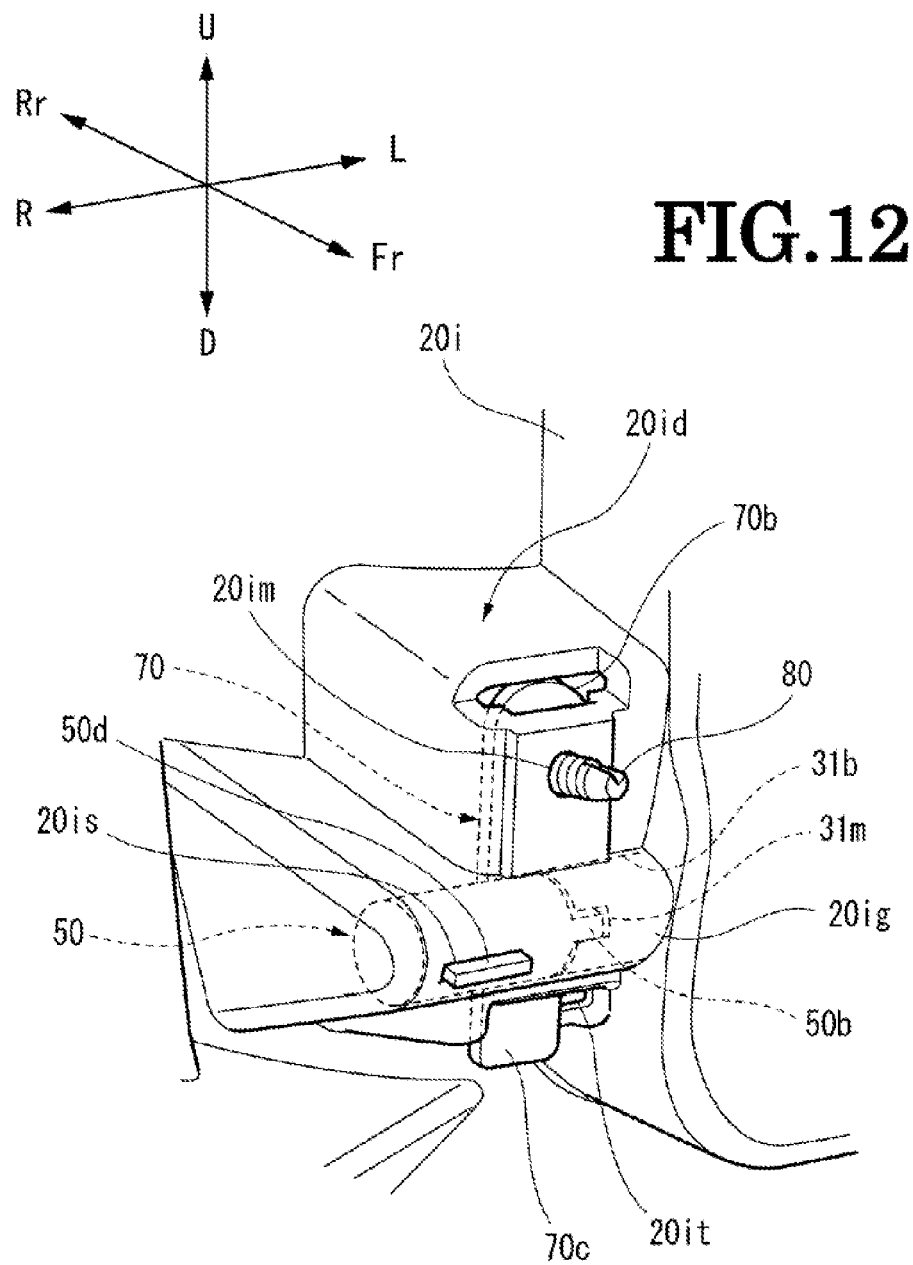

ARTICLE STORAGE STRUCTURE FOR AUTOMATIC TWO-WHEELED VEHICLES

TECHNICAL FIELD

The present invention relates to an article storage structure for an automatic two-wheeled vehicle.

BACKGROUND ART

As an article storage structure for an automatic two-wheeled vehicle, there is known an article storage structure for an automatic two-wheeled vehicle in which a body front portion is covered by a front cover and a tear cover to thereby define a ride-on-space in front of a mounting seat, wherein an article storage portion is provided in the rear cover. In this article storage structure, a lid member for an opening portion of the article storage portion is supported rotatably towards a body side via an arm member and is biased in an opening direction by means of a spring mounted, on a pivot (For example, refer to patent literature 1.).

RELATED ART LITERATURE

Patent Literature

Patent Literature 1: JP-B-4200839

SUMMARY OF THE INVENTION

Problem that the Invention is to Solve

Incidentally, in the article storage portion described in patent literature 1 above, the arm member which supports the lid member rotatably is the arm-shaped member which projects radially outwards in relation to the pivot, and this causes a problem that the structure around the pivot becomes large. Additionally, the structure is necessary by which the spring is assembled to the pivot, and this makes the mounting structure of the lid member complex, leading to a problem that the article storage portion becomes large in size.

The invention has beers made in view of these situations, and an object thereof is to provide an article storage structure for an automatic two-wheeled vehicle which can simplify the mounting structure of a lid member so as to provide a compact article storage portion.

Means for Solving the Problem

An article storage structure for an automatic two-wheeled vehicle according to the invention, includes:
a cover member which is configured to covers a vehicle external side,
an article storage portion, which is disposed inside the cover member and enables to store an article,
a lid member which opens or closes an opening portion of the article storage portion,
a pivot which is provided in the lid member, and which defines a rotational axis along an external surface of the lid member, and
a rotary damper which is provided on the rotational axis, and which is engaged with one end portion of the pivot so as to dampen a rotation of the lid member.

In the article storage structure for the automatic two-wheeled vehicle, the rotary damper may include a substantially cylindrical main body portion extending along the rotational axis, a damper operating portion provided at one end of the main body portion and connected to the one end portion of the pivot, and a rotation preventive projection formed so as to project radially from an outer circumferential surface of the main body portion to thereby be locked on the cover member.

In the article storage structure for the automatic two-wheeled vehicle, the cover member may include a rear cover covering a rear surface side of a head pipe at a vehicle front portion, a ride-on-space may be defined between the rear cover and a mounting seat, the rear cover may include an outer panel situated on an outer side of a vehicle body and an inner panel situated on an inner side of the outer panel, the outer panel and the inner panel being superposed one on the other, and the rotary damper may be held between the outer panel and the inner panel.

The article storage structure for the automatic two-wheeled vehicle may further include a fastening stay which is configured to fasten the pivot and the rotary damper together to the inner panel.

In the article storage structure for the automatic two-wheeled vehicle, a support groove may be provided in the inner panel and is configured to support the pivot and the rotary damper so as to surround them.

In the article storage structure for the automatic two-wheeled vehicle, a bearing hole may be provided on a side of the inner panel which is opposite to the side where the support groove is provided and is configured to support rotatably the other end portion of the pivot.

In the article storage structure for the automatic two-wheeled vehicle, the lid member may include an inner lid portion and an outer lid portion, the inner lid portion may be formed more rigid than the outer lid portion, and the pivot may be provided on the inner lid portion.

Advantage of the Invention

According to the article storage structure for the automatic two-wheeled vehicle of the invention, the pivot which defines the rotational axis along the external surface of the lid member is provided in the lid member, and the rotary damper is provided on the rotational axis so as to be brought into engagement with the one end portion of the pivot to thereby dampen the rotation of the lid member. Consequently, the mounting structure of the lid member on the periphery of the pivot, can be simplified, thereby making it possible to make the article storage portion compact.

Further, the rotary damper includes the substantially cylindrical main body portion which extends along the rotational axis, the damper operating portion which is provided at the one end of the main body portion so as to be connected to the one end portion of the pivot, and the rotation preventive projection which is formed so as to project radially from, the outer circumferential surface of the main body portion to thereby be locked on the cover member. Consequently, the connecting structure of the rotary damper with the pivot and the Using structure of the rotary damper can be provided compact.

Furthermore, the rotary damper is held between the outer panel which, is situated on the outer side of the vehicle body and the inner panel which is situated on the inner side of the vehicle body. Consequently, the opening/closing structure of the lid member can be disposed compact, while ensuring the ride-on-space by making effective use of the space between the outer panel and the inner panel.

Moreover, the fastening stay is provided which fastens the pivot and the rotary damper together to the inner panel. Consequently, the pivot and the rotary damper can be fixed to the inner panel strongly and rigidly. Additionally, since the pivot and the rotary damper do not have to be provided separately, the number of parts can be reduced, thereby making it possible to make the storage structure compact.

Further, the support groove is provided in the inner panel which supports the pivot and the rotary damper so as to surround them. Consequently, the support surface of the pivot and the rotary damper defined by the inner panel can be increased to thereby enhance the holding force, Additionally, in assembling the pivot and the rotary damper, the pivot and the rotary camper are held so as to fit in the support groove, and therefore, both the members can be fastened temporarily, this enhancing the assemblage of the members.

Furthermore, the bearing hole which supports rotatably the other end portion of the pivot is provided on the side of the inner panel which is opposite to the side where the support groove is provided. Consequently, in assembling the lid member, the other end portion of the pivot is inserted through the bearing hole, and thereafter, the one end portion of the pivot is supported in the support groove, whereby the lid member can be assembled to the article storage portion. Consequently, the assemblage of the lid member can be enhanced.

Moreover, since the pivot is provided on the inner lid portion which is formed more rigid than the outer lid portion, not only can the airtightness of the article storage portion be enhanced, but also the durability of the lid member against wind or the like when it is opened can be enhanced.

BRIEF DESCRIPTION OF THE DRAWINGS

FIG. 7 is an enlarged perspective view of a main part of the lid member shown in FIG. 3 which shows how to install the lid member.

FIG. 11 is a perspective view of the lid member shown in FIG. 9 which shows a state in which a fastening stay is attached In an installation process of the lid member.

FIG. 12 is a perspective view of a part of the lid member as seen from a rear side thereof which shows a state in which the fastening stay shown in FIG. 11 is attached.

Figure 1:
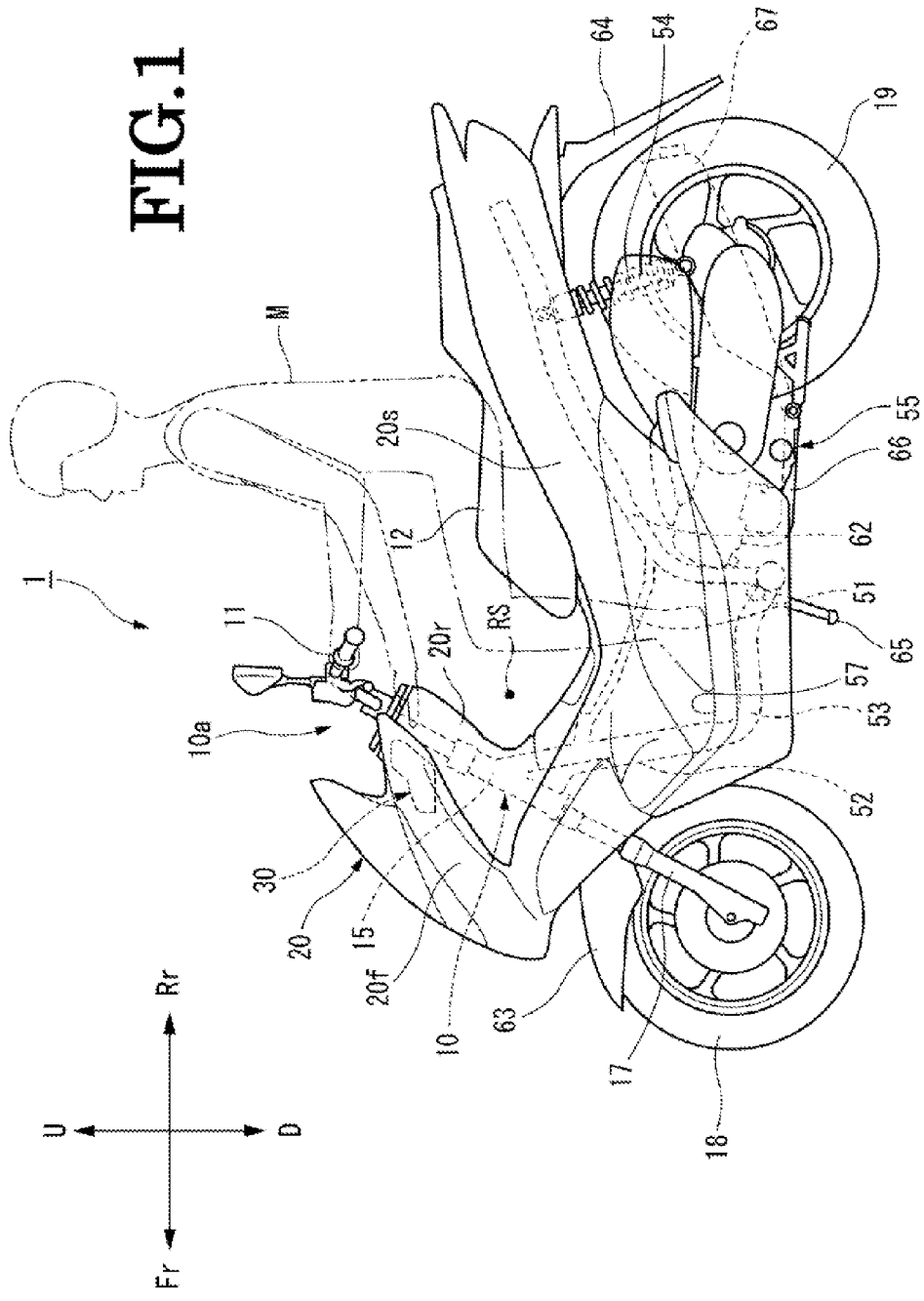
FIG. 1 is a left side view which illustrates an automatic two-wheeled vehicle which adopts a first embodiment of an article storage structure according to the invention.

MODE FOR CARRYING OUT THE INVENTION (First Embodiment)

Hereinafter, referring to FIGS. 1 to 8, a first embodiment of an article storage structure for an automatic two-wheeled vehicle according to the invention will be described specifically. It is noted that the drawings should be seen in a direction in which reference numerals given therein look normal. Additionally, Fr, Rr, U, D, R, L shown in the drawings denote a forward direction, a rearward direction, an upward direction, a downward direction, a rightward direction, and a leftward direction of a vehicle of the embodiment, respectively.

An automatic two-wheeled vehicle 1 of this embodiment includes a body frame 10 as shown in FIG. 1, This body frame 10 includes a head pipe 15 which is provided at a vehicle front portion 10a, a down tube 52 which extends rearwards and downwards from the head pipe 15, a front frame 51 which extends substantially rearwards from a middle portion of the down tube 52, a lower tube 53 which extends rearwards from a lower end of the down tube 52, and a rear frame 62 which extends upwards from a rear end of the lower tube 53 and then extends rearwards and upwards. Additionally, an outer side of the body frame 10 is covered by a cover member 20.

In addition, the automatic two-wheeled vehicle 1 includes a front fork 17 which is attached rotatably to the head pipe 15, a handlebar 11 which is attached to an upper end portion of the front fork 17, a front wheel 18 which is mounted rotatably at a lower end portion of the front, fork 17, a power unit 55 which is mounted so as to swing up and down at a rear end portion of the lower tube 53, a rear wheel 19 which is mounted at a rear end portion of the power unit 55, and rear cushions 54 which are mounted between a rear end of the power unit 55 and the rear frame 62.

In FIG. 1, reference numeral 63 denotes a front fender, 64 denoting a rear fender, 65 denoting a side stand 66 denoting an exhaust pipe, and 67 denoting a muffler. A driver M rides on the automatic two-wheeled vehicle 1 by sitting on a mounting seat 12 which is disposed to the rear of the handlebar 11, resting his or her feet on a lower floorboard portion 57, which will be described later, and gripping on the handlebar 11.

The cover member 20 has a front cover 20f which covers a front side of the head pipe 15, a rear cover 20r which covers a rear side of the head pipe 15, side covers 20s which continue to a lower edge of the rear cover 20r and extend rearwards, and the lower floorboard portion 57 which continues to lower edges of front portions of the side covers 20s and which is formed substantially horizontal. Additionally, a ride-on-space RS is defined in front of the mounting scat 12 by the rear cover 20r and the mounting seat 12.

Figure 2:
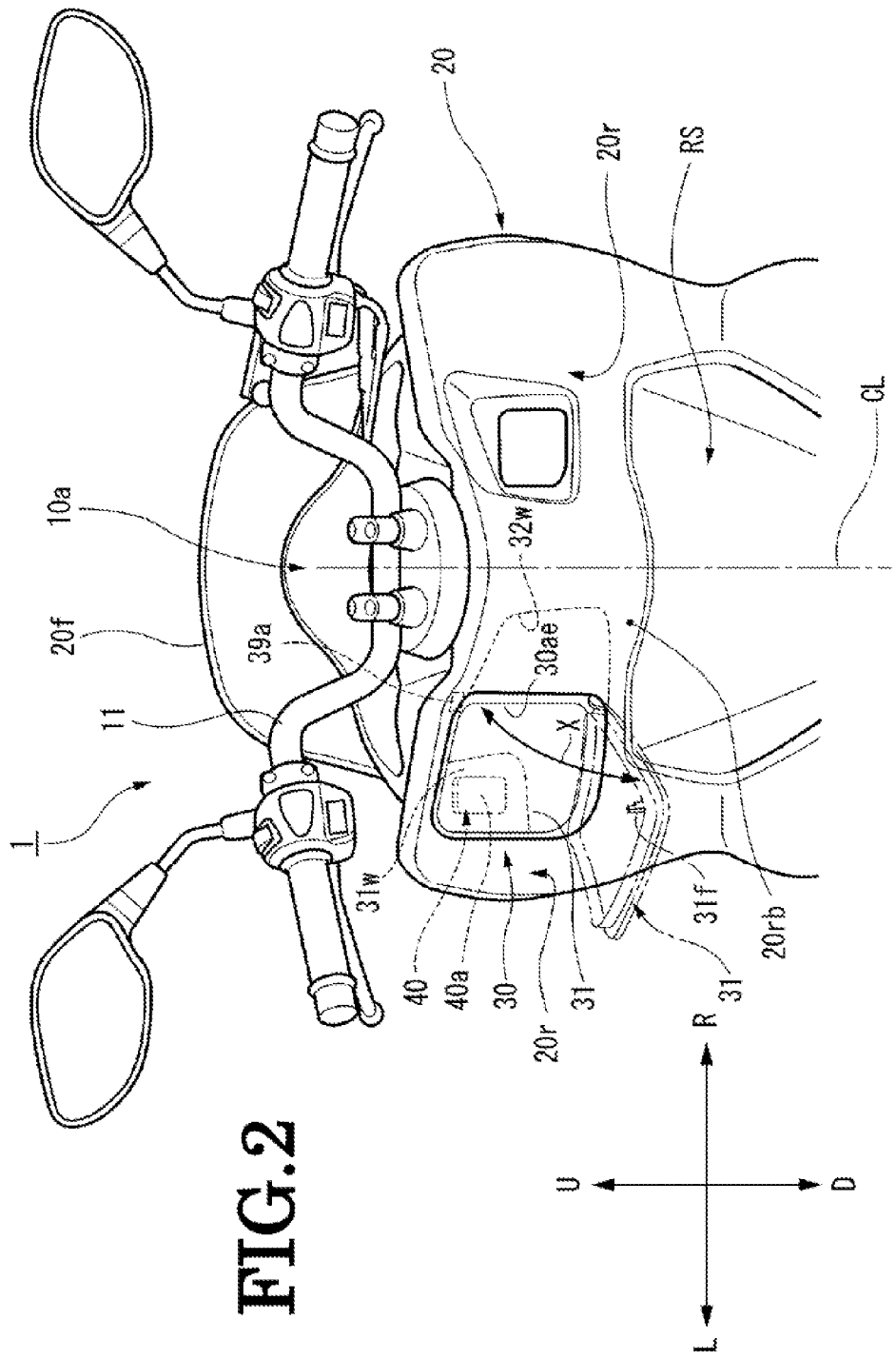
FIG. 2 is a rear view of the automatic two-wheeled vehicle shown in FIG. 1 which results when an open leg resting portion therein is seen from a rear of the vehicle.

In the article storage structure of this embodiment, an article storage portion 30 has an opening portion 30a in a rear wall surface 20rb of the rear cover 20r which defines the ride-on-space RS on a rear surface side of the head pipe 15 at the vehicle front portion 10a, as shown in FIGS. 1 and 2. The article storage portion 30 includes a lid member 31 which opens or closes the opening portion 30a. Consequently, as shown in FIG. 2, the opening portion 30a of the article storage portion 30 is opened to the rear of the vehicle body.

Figure 3:
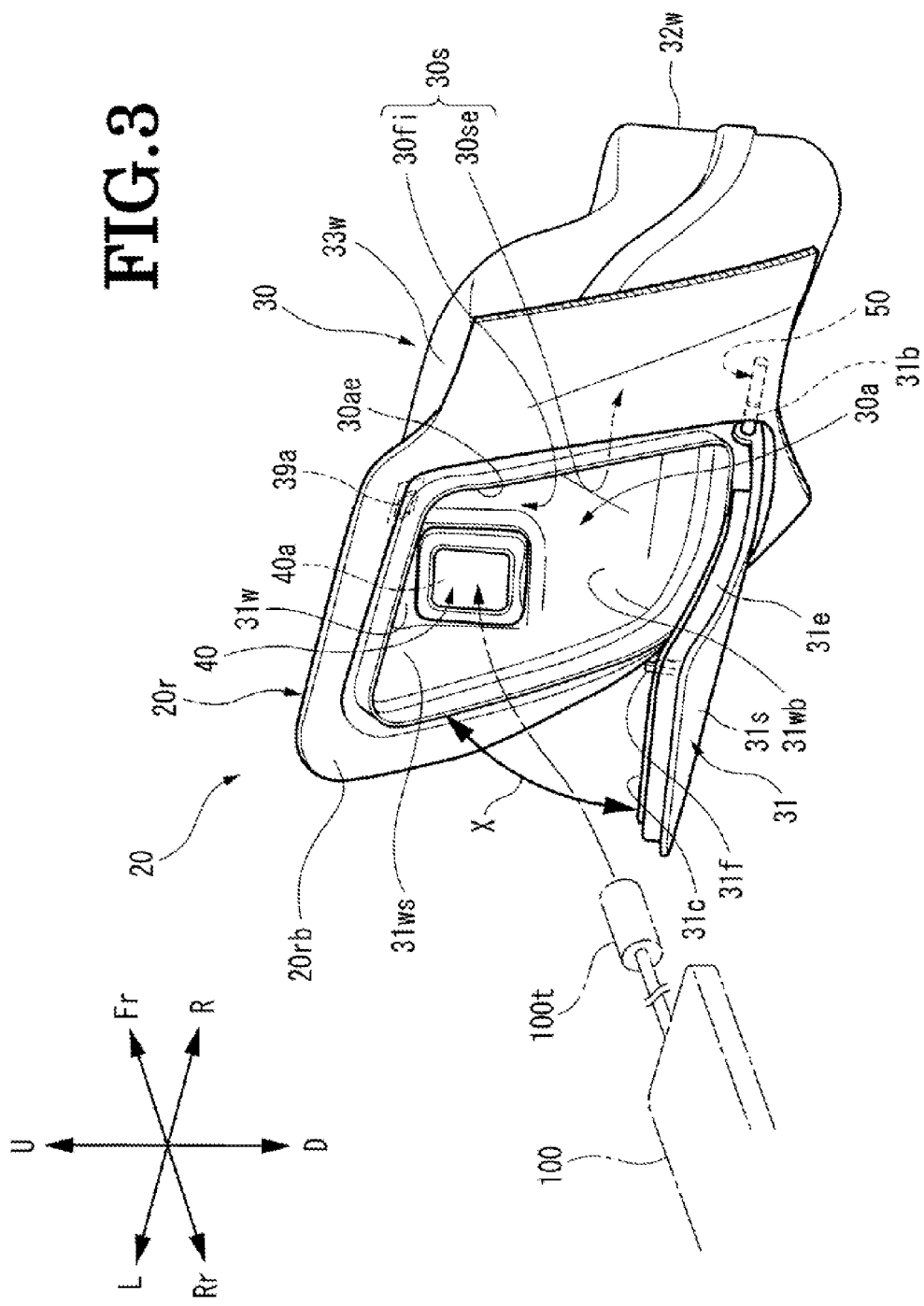
FIG. 3 is an enlarged view snowing a state in which a lid member of the article storage portion shown in FIG. 1 is opened.

For example, as shown in FIG. 3, the article storage portion 30 includes a storage space 30s which is made up of a first storage space 30fi having a power supply socket 40 In a first inner wall 31w which feces the opening portion 30a and a second storage space 30se having a second inner wall 32w which lies further forwards and downwards than the first storage space 30fi. Additionally, an engagement hole 39a is provided on an upper wall 33w which defines the storage space 30s, and a locking hook 31f of a lid member 31, which will be described later, is kicked in this engagement hole 39a. Additionally the power supply socket 40 includes a socket connection, port 40a to which a connection terminal portion 100*t* of an external electrical appliance 100 such as a mobile phone, for example, is connected.

In the article storage portion 30, for example, as shown in FIGS. 2 and 3, the lid member 31 includes a pivot 31*b* at a lower side thereof and is constructed to open or close in a vertical direction (a direction indicated by an arrow X). The pivot 31*b* is provided in the lid member 31, and the pivot 31*b* defines a rotational axis C which runs m a lateral direction along an external surface 31*s* of the cover member 20. Then, a rotary damper 50 is disposed on this rotational, axis C, and this rotary damper 50 dampens the rotation of the pivot 31*b*. The lid member 31 includes the locking hook 31*f* (Refer to FIG. 4.) at a top right-hand side portion, whereby the opening portion 30*a* can freely be opened or closed by the lid member 31.

Figure 4:
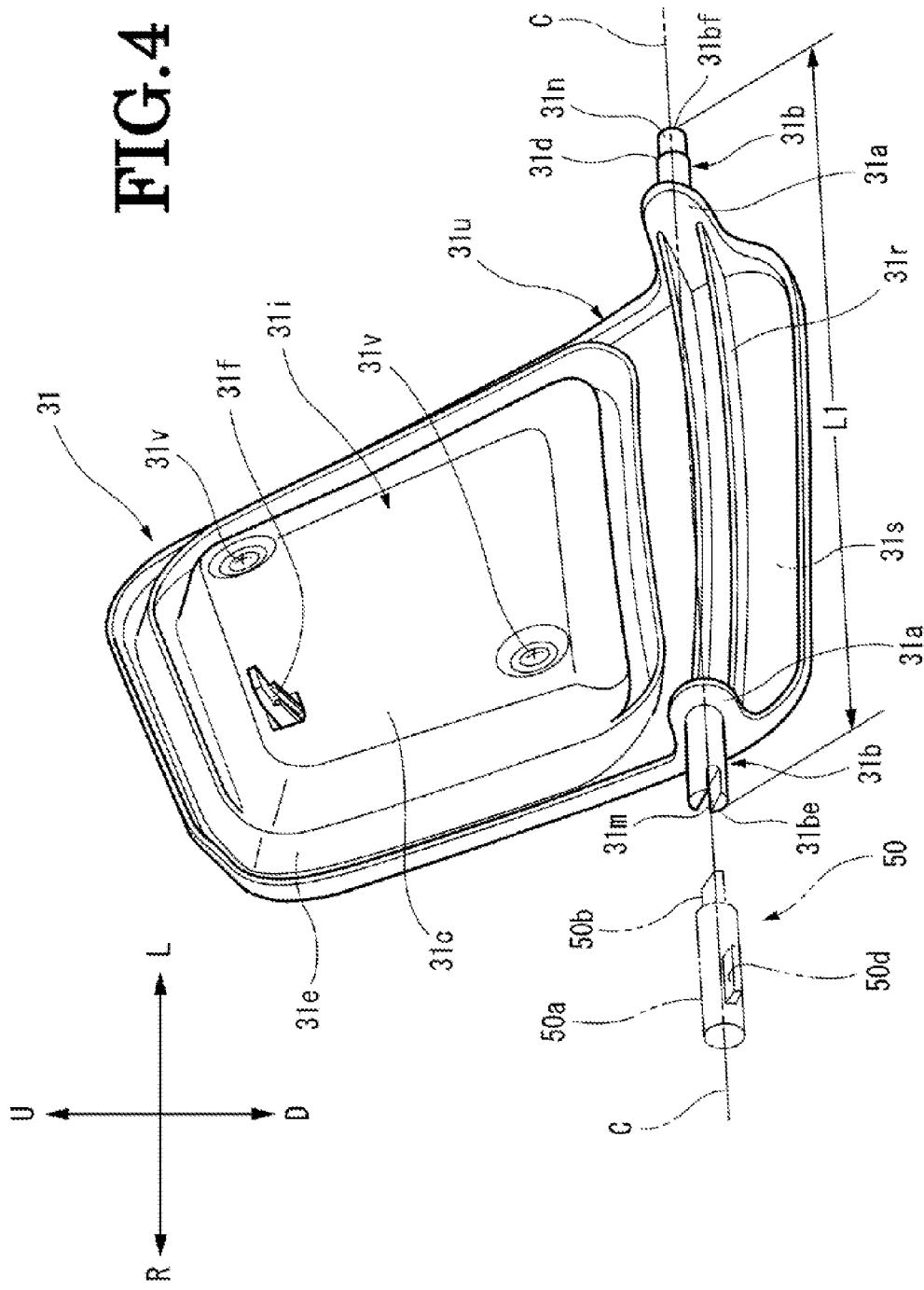
FIG. 4 is a perspective view of an inner side of the lid member shown in FIG. 3.

As shown in FIG. 4, the lid member 31 includes the pivot 31*b* which projects laterally from lower lateral side walls 31*a* thereof. Namely, the pivot 31*b* is formed on the lateral side wails 31*a* which extend inwards of the rear cover 20*r* so as to have an overall length L1 which is larger than a lateral width of the lid member 31. The pivot 31*b* is also formed so that the rotational axis C runs substantially along the external, surface 31*s*.

The lid member 31 includes an outer lid portion 31*u* and an inner lid portion 31*i* and is formed into a shape which follows substantially the rear wall surface 20*rb* of the rear cover 20*r* so that the external surface 31*s* of the outer lid portion 31*u* does project into the ride-on-space RS when the lid member 31 closes the opening portion 30*a*.

Figure 5:
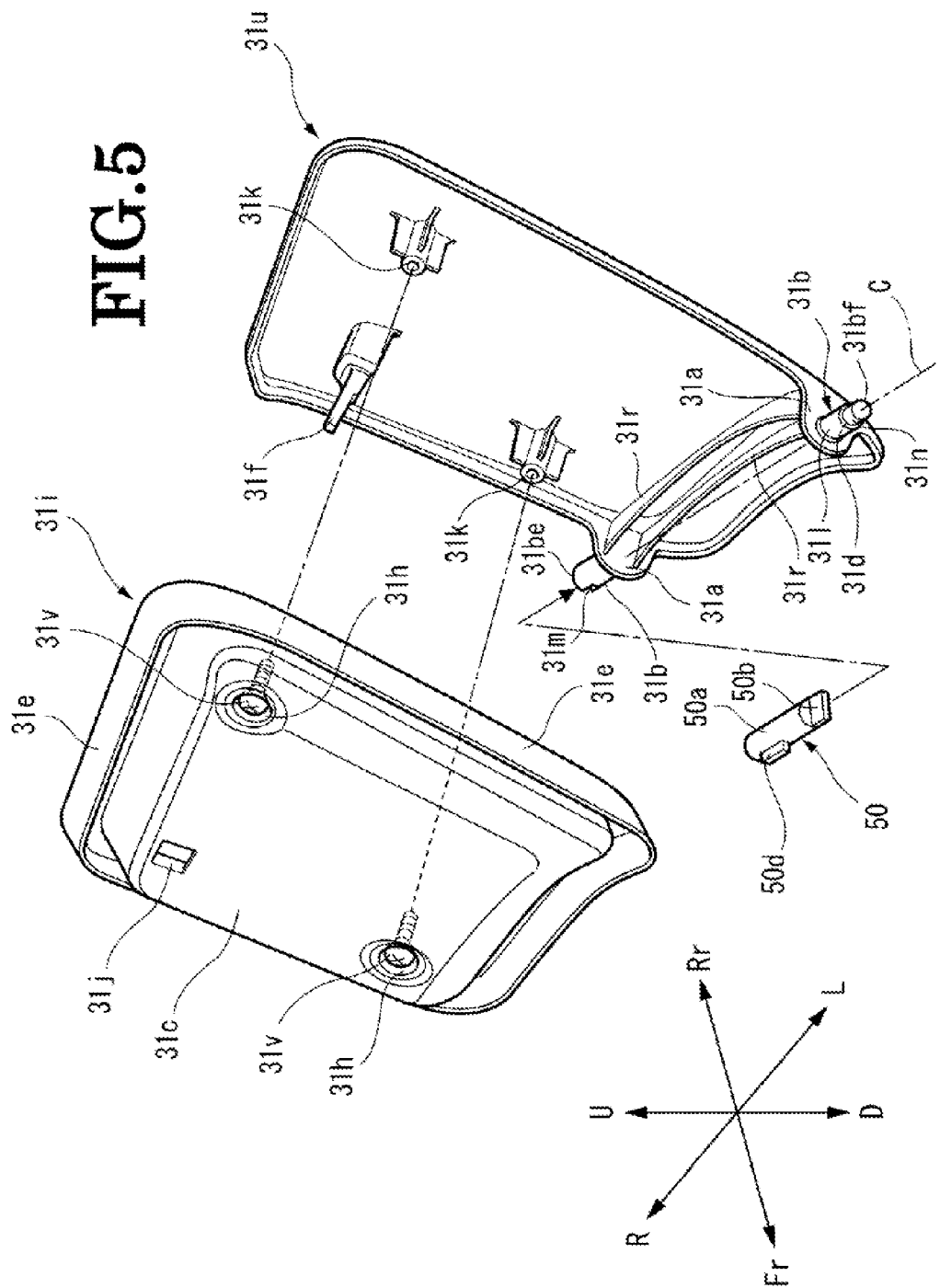
FIG. 5 is an exploded perspective view of the lid member shown in FIG. 4.

As shown in FIG. 5, in the lid member 31, the inner lid portion 31*i* is fixed to an inner side of the outer lid portion 31*u* with fastening screws 31*v*. The inner lid portion 31*i* is formed so as to tit in an inside of an opening edge portion 30*ae* of the opening portion 30*a*, while the outer lid portion 31*u* is formed so as to cover an outer side of the opening edge portion 30*ae*. Therefore, the opening portion 30*a* of the article storage portion 30 is closed by the lid member 31 in an ensured fashion.

The inner lid portion 31*i* has at a central portion thereof a central trapezoidal portion 31*e* having a substantially trapezoidal shape in a section taken along a thickness direction of the lid member 31. The inner lid portion 31*i* has an outer circumferential edge portion 31*e* on an outer circumferential side of the central trapezoidal portion 31*c*. The outer circumferential edge portion 31*e* projects in such a way as to be folded back inwards in relation to the thickness direction of the lid member 31. Consequently, the inner lid portion 31*i* is formed more accurately and rigidly than, the outer lid portion 31*u* by having the central trapezoidal portion 31*e* and the outer circumferential edge portion 31*e*. Additionally, the outer circumferential edge portion 31*e* constitutes a portion which is brought into abutment with the opening edge portion 30*ae* when the outer circumferential edge portion 31*e* fits in the inside of the opening portion 30*a*, and therefore, the opening portion 30*a* can be closed in an ensured fashion by the outer circumferential edge portion 31*e*. In addition, the inner lid portion 31*i* has two mounting holes 31*h* through which the fastening screws 31*v* are inserted to fasten the inner lid portion 31*i* and the outer lid portion 31*u* together and a hole portion 31*j* through which the locking hook 31*f* formed on the outer lid portion 31*u* is put.

As has been described above, the pivot 31*b* is provided in the outer lid portion 31*u* so as to extend laterally, and the locking hook 31*f* is provided on the outer lid portion 31*u* so as to project along the direction in which the lid member 31 is opened or closed. Additionally, two boss portions 31*k* are provided on the outer lid portion 31*u* so as to project therefrom for attachment of the inner lid portion 31*i* thereto. In addition, an engagement groove 31*m* is provided in one end portion 31*be* (a right-hand side end portion when the pivot 31*b* is installed properly) of the pivot 31*b*, and this engagement groove 31*m* is cut into the one end portion 31*be* along the direction of the rotational axis C. A small-diameter portion 31*n* is provided at the other end portion 31*bf* (a left-hand side end portion when the pivot 31*b* is installed properly) of the pivot 31*b*. This small-diameter end portion 31*n* is formed smaller in diameter via a step portion 31*d*. In order to enhance the rigidity of the pivot 31*b* which projects laterally from the left- and the right-hand sides of the lid outer portion 31*u*. reinforcement ribs 31*r* are provided between the lateral side walls 31*a*.

As shown in FIGS. 3, 4 and 5, the rotary damper 50 includes a substantially cylindrical main body portion 50*a*. which extends along the rotational axis C and which is substantially as thick as the pivot 31*b*, a damper operating portion 50*b* which is provided at one end of the main body portion 50*a* so as to be fittingly connected to the engagement groove 31*m* in the pivot 31*b*, and a rotation preventive projection 50*d* which is formed so as to project radially from an outer circumferential surface of the main body portion 50*a* so as to be locked in a slit hole 20*is* in the inner panel 20*i*, which will be described later.

In this rotary damper 50, when the damper operating portion 50*b* is subjected to a force which turns around the rotational axis C with the main body portion 50*a* fixed as required, the attempted rotation is slowed to be decelerated. Consequently, for example, when the lid member 31 opens by means of its own weight, the rotary damper 50 decelerates the rotation of the lid member 31 so that the lid member 31 can open smoothly. No specific limitation is imposed on the structure of the rotary damper 50. However, various systems can be made use of which include a system in which friction produced between rotational surfaces is made use of, a system in which the rotation of the lid member is slowed by means of hydraulic resistance and the like.

Next, referring to FIGS. 6 to 8, a mounting structure of the lid member 31 and the rotary damper 50 of this embodiment will be described.

Figure 6:
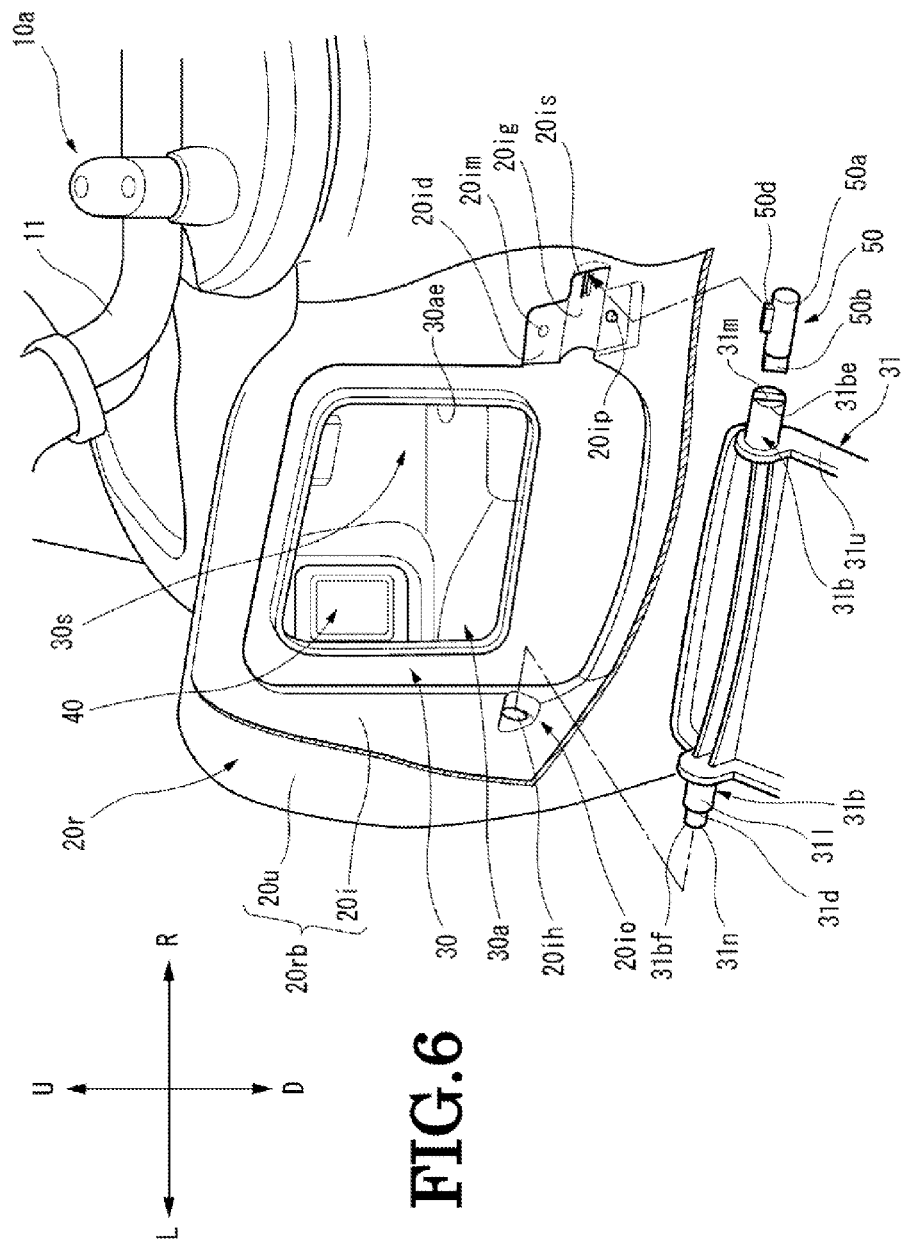
FIG. 6 is a rear view of a main part of the lid member shown in FIG. 3 in an installation process thereof.

As shown in FIG. 6, the rear cover 20*r* of this embodiment has a double-layer structure in which an outer panel 20*u* which is situated on an outer side of the vehicle body and an inner panel 20*i* which is situated on an inner side of the vehicle body are superposed on the rear wall surface 20*rb*. The inner panel 20*i* includes mounting structures of the lid member 31 at bottom left- and right-hand sides of the opening portion 30*a*. Namely, a left-hand side support portion 20*io* is provided at the left-hand side of the opening portion 30*a*, and this left-hand side support portion 20*io* includes a bearing bole 20*ih* which receives rotatably the small-diameter portion 3 in of the pivot 31*b*. On the other hand, a right-hand side support portion 20*id* is provided at the right-hand side of the opening portion 30*a*, and this right-hand side support portion 20*id* has a support groove 20*ig* which can hold the pivot 31*b* together with the rotary damper 50.

When the lid member 31 is installed, the pivot 31*b* is assembled to the left-hand side support portion 20*io* and the right-hand side support portion 20*id*. Firstly, as shown, in FIG. 7, the small-diameter portion 31*n* at the other end portion 31*bf* of the pivot 31*b* is inserted into the bearing hole 20*ih*. As this occurs, in the left-hand side support portion 20*io*, the step portion 31*d* of the small-diameter portion 31*n* and a large-diameter portion 31*l* are brought into abutment with a bearing side wall 20*iw*, the pivot 31*b* is positioned in the lateral direction.

On the other hand, in the right-hand side support portion 20id, as shown in FIG. 6, the pivot 31b is placed opposite to the support groove 20ig having a semicircular cross section, and the rotary damper 50 is disposed on a right-hand side of the pivot 31b. Here, the rotary damper 50 is installed so that the damper operation portion 50b is fitted in the engagement groove 31m in the pivot 31b and that the rotation preventive projection 50d is fitted. In the slit hole 20is formed inside the support groove 20ig.

Figure 8:
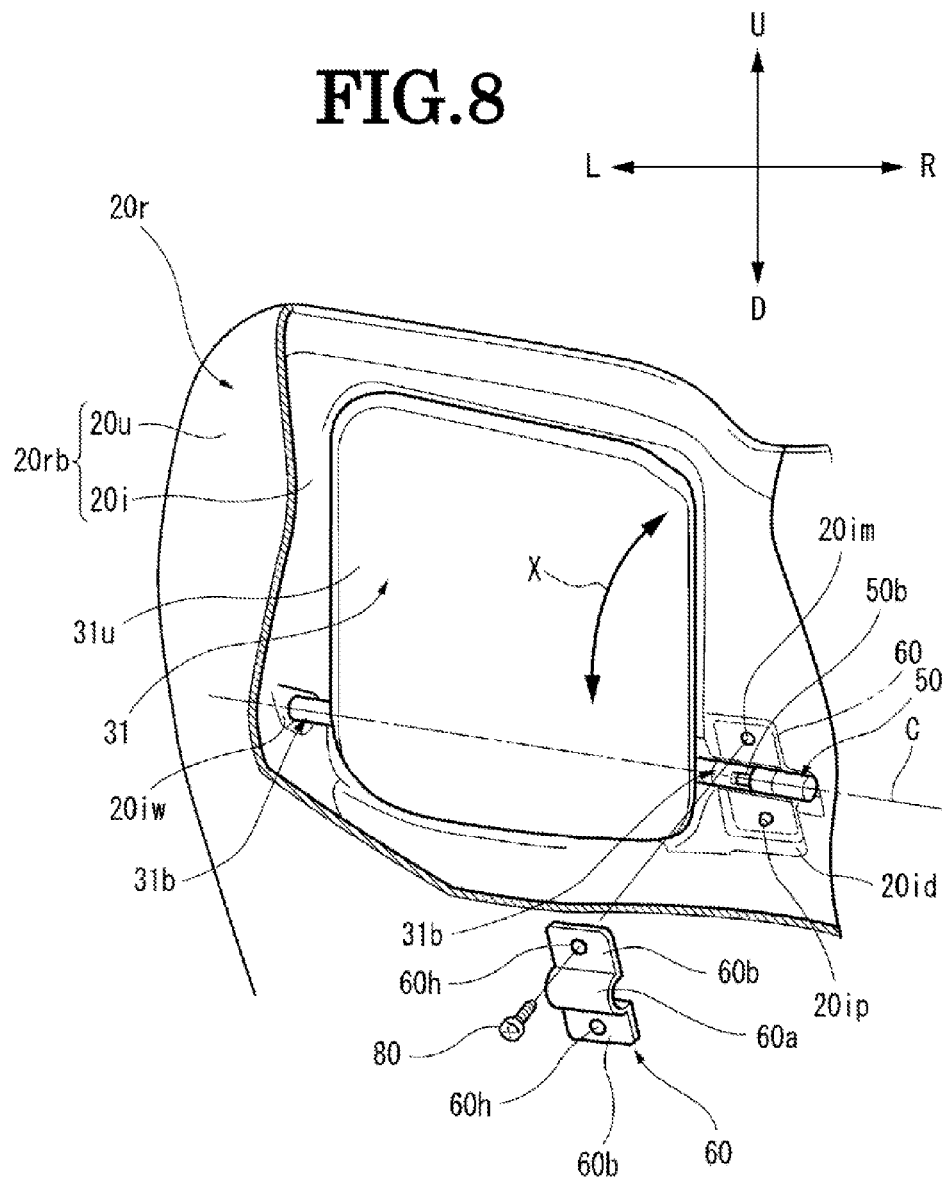
FIG. 8 Is a rear view of a main part of the lid member shown in FIG. 3 which shows a state in which the lid member and a rotary damper are attached in the installation process of the lid member.

Thereafter, in the right-hand, side support portion 20id, as shown in FIG. 8, a fastening stay 60 which fastens the pivot 31b and the rotary damper 50 is installed. A surrounding portion 60a having a semicircular cross section surrounding the pivot 31b and the rotary damper 50 is provided in the fastening stay 60, and mounting holes 60h are provided individually in fiat portions 60b at upper and lower sides of the surrounding portion 60a. Consequently, the lower mounting hole 60h is fitted on a fixing projection 20ip, and a fixing screw 80 is inserted through the upper mounting hole 60h to be screwed into a screw receiving hole 20im, whereby the pivot 31b and the rotary clamper 50 are fastened together to the inner panel 20i.

In this way, after the lid member 31 is fixed to the inner panel 20i, the outer panel 20u is placed to be superposed on the inner panel 20i via an appropriate fixing member such as a fitting member, for example. As a result of this, the rotary damper 50 is provided on the cover member 20 while being sandwiched between the outer panel 20u and the inner panel 20i.

Thus, as has been described heretofore, according to the article storage structure of the automatic two-wheeled vehicle I of this embodiment, the pivot 31b is provided in the lid member 31 so as to define the rotational axis C which runs along the external surface of the lid member 31, and the rotary damper 50 is provided on the rotational axis C so as to be brought into engagement with the one end portion 31be of the pivot 31b to thereby dampen the rotation of the lid member 31. Consequently, the mounting structure of the lid member 31 on the periphery of the pivot 31b can be simplified, thereby making it possible to make the article storage portion 30 compact. In addition, the lid member 31 opens by means of its own weight, which obviates the necessity of the conventional spring which biases the lid member to open. Thus, the mounting structure of the lid member 31 can be simplified further, thereby making it possible to make the article storage portion 30 more compact.

According to the article storage structure of the automatic two-wheeled vehicle 1 of this embodiment, the rotary damper 50 includes the substantially cylindrical main body portion 50a which extends along the rotational axis B the damper operating portion 50b which is provided at the one end of the main body portion 50a so as to be connected to the one end portion 31be of the pivot 31b, and the rotation preventive projection 50d which is formed so as to project radially from the outer circumferential surface of the main body portion 50a to thereby be locked in the slit hole 20is in the support groove 20ig on the cover member 20. Consequently, the connecting structure of the rotary damper 50 with the pivot 31b and the fixing structure of the rotary damper 50 can be provided compact.

According to the article storage structure of the automatic two-wheeled vehicle 1. of this embodiment, the rotary damper 50 is held between the outer panel 20u which is situated on the outer side of the vehicle body and the inner panel 20i which is situated on the inner side of the vehicle body. Consequently, the opening/closing structure of the lid member 31 can be disposed compact while ensuring the ride-on-space RS by making effective use of the space between the outer panel 20u and the inner panel 20i. in addition, the rotary damper 50 is invisible externally, and therefore, the external appearance of the lid member 31 is enhanced.

According to the article storage structure of the automatic two-wheeled vehicle 1 of this embodiment, the fastening stay 60 is provided which fastens the pivot 31b and the rotary damper 50 together to the inner panel 20i. Consequently, the pivot 31b and the rotary damper 50 can be fixed to the inner panel 20i strongly and rigidly. Additionally, since the pivot 31b and the rotary damper 50 are fixed together integrally, the number of parts can be reduced, thereby making it possible to make the storage structure compact.

According to the article storage structure of the automatic two-wheeled vehicle 1 of this embodiment, the support groove 20ig is provided in the inner panel 20i which supports the pivot 31b and the rotary damper 50 so as to surround them. Consequently, the support surface of the pivot 31b and the rotary damper 50 defined by the inner panel 20i can be increased to thereby enhance the holding force. Additionally, in assembling the pivot 31b and the rotary damper 50, the pivot 31b and the rotary camper 50 are held so as to fit in the support groove 20ig, and therefore, both the members can be fastened temporarily, this enhancing the assemblage of the members.

According to the article storage structure of the automatic two-wheeled vehicle 1 of this embodiment, the bearing hole 20ih which supports rotatably the other end portion 31bf of the pivot 31b is provided on the side of the inner panel 20i which is opposite to the side where the support groove 20ig is provided. Consequently, in assembling the lid member 31. the other end portion 31bf of the pivot 31b is inserted through the bearing hole 20ih, and thereafter, the one end portion 31be of the pivot 31b is supported in the support groove 20ig, whereby the lid member 31 can be assembled to the article storage portion. Consequently, the assemblage of the lid member 31 can be enhanced.

(Second Embodiment)

Next, referring to FIGS. 9 to 12, a second embodiment of an article storage structure for an automatic two-wheeled vehicle according to the invention will be described specifically, in the second embodiment, the illustration and description of like structures to those of the first embodiment will be omitted as required, and structures which differ from those of the first embodiment and their peripheral structures will only be illustrated. Additionally, like reference numerals will be given to like constituent elements to those of the first embodiment, and the description thereof will be omitted.

Figure 9:
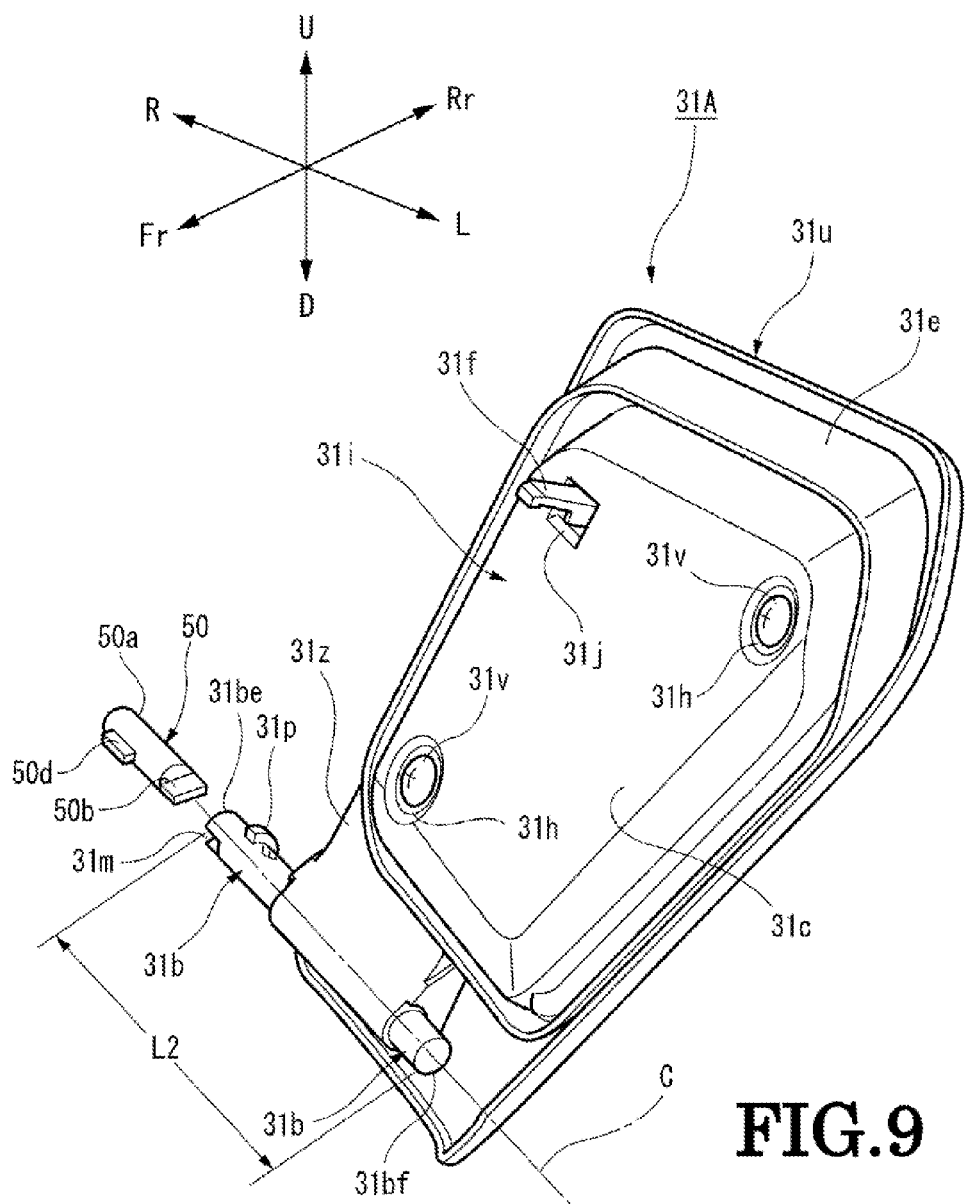
FIG. 9 is a perspective view of an inner side of a lid member of a second embodiment according to the invention.
Figure 10:
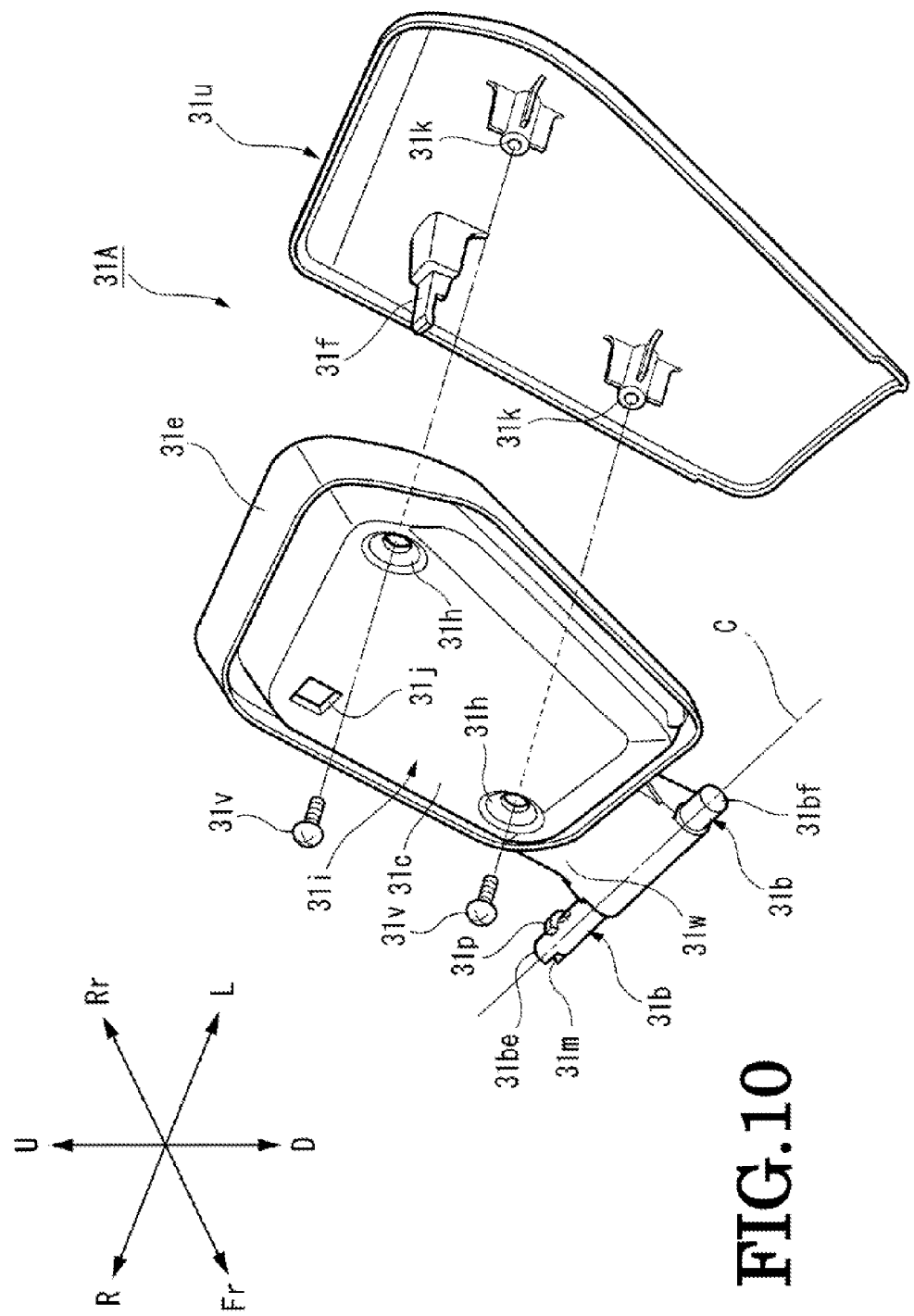
FIG. 10 is an exploded perspective view of the lid member shown in FIG. 9.

A lid member 31A of this embodiment is similar in structure to the lid member 31 of the first embodiment in that the former also includes an inner lid portion 31i which is formed so as to fit in an inside of an opening edge portion 30ae of an opening portion 30a and an outer lid portion 31u which is formed so as to cover an outer side of the opening edge portion 30ae as shown in FIGS. 9 and 10. However, the lid member 31A differs from the lid member 31 in that a pivot 31b is provided in the inner lid portion 31i. Additionally, the lid member 31A has a different shape and a different mounting structure of a fastening stay 70. In this embodiment, too, the inner lid portion 31i has a central, trapezoidal portion 31c and an outer circumferential edge portion 31e and is, hence, formed more rigid than the outer lid portion 31u.

An extending portion 31z extending downwards is formed at a lower end of the inner lid portion 31i of this embodiment, and the pivot 31b is formed so as to project from a left- and right-hand sides of the extending portion 31z. Similarly to the first embodiment, an engagement groove 31m is formed in one end portion 31be of the pivot 31b. A circumferential rib 31p having a predetermined length, is formed circumferentially on an outer circumferential surface of the pivot 31b which lies adjacent to the engagement groove 31m. The other end portion 31bf of the pivot 31b is disposed further inwards than a lateral outer end portion of the outer lid portion 31u, and an overall length L2 of the pivot 31b is set shorter than the overall length L1 of the pivot 31b of the first embodiment. Consequently, the pivot 31b of this embodiment is more rigid, thereby making it possible to enhance the strength and durability of the rotational portion.

Next, referring to FIGS. 11 and 12, a mounting structure of the lid member 31A of this embodiment will be described.

In mounting the lid member 31A, similarly to the first embodiment, a left distal end of the pivot 31b is inserted into a bearing hole (having substantially the same configuration as that of the bearing hole 20ih shown in FIG. 6), not shown, and the pivot 31b and a rotary damper 50 are installed in a support groove 20ig with the rotary damper 50 fitted in the engagement groove 31m in the pivot 31b as shown in FIG. 11. As this occurs, a rotation preventive projection 50d of the rotary damper 50 is inserted into a slit hole 20is. Then, the fastening stay 70 is installed after the rotary damper 50 and the pivot 31b have been Installed in the way described above.

Similarly to the first embodiment, the fastening stay 70 includes a surrounding portion 70a having a semicircular cross section which can fasten the rotary damper 50 and the pivot 31b so as to surround them. Although a mounting hole 70h is formed in an end portion of a flat portion 70b on an upper side of the surrounding portion 70a, a mounting hole 70h is not formed in an end portion of a flat portion 70c on a lower side, thus, the lower flat portion 70c being formed simply into a flat plane.

Consequently, in installing the fastening stay 70, as shown in FIGS. 11 and 12, the flat portion 70c is inserted into a long elongated slit hole 20it, and a fixing screw 80 which is inserted through the mounting hole 70h is screwed into a screw receiving hole 20im. Thereafter, an outer panel 20u, not shown, is installed so as to cover the fastening stay 70. The fastening stay 70 installed in this way not only fastens the rotary damper 50 and the pivot 31b to an inner panel 20i in an ensured fashion but also controls the position of the pivot 31b in relation to the direction of a rotational axis C since a side edge 70e is disposed opposite to a lateral side surface of the circumferential rib 31p so as to be in contact therewith.

Thus, as has been described heretofore, according to the article storage structure of the automatic two-wheeled vehicle 1 of this embodiment, the pivot 31b is provided in the inner lid portion 31i which is formed more rigid than the outer lid portion 31u, and therefore, the airtightness of an article storage portion 30 can be enhanced, and the durability of the lid member 31A against wind when it is opened can also be enhanced.

The other configurations and working effects are similar to those of the first embodiment.

The invention is not limited to the embodiments and, hence, can be altered or modified as required without, departing from the spirit and scope thereof.

For example, in the embodiments, while the article storage portion 30 is disposed on the left-hand side of the vehicle, the invention is not limited thereto, and hence, the article storage portion 30 may be disposed on the right-hand side of the vehicle.

In addition, in the embodiments, while the lid member 31, 31A of the article storage portion 30 is constructed, to open vertically, the invention is not limited thereto, and hence, the lid member may be constructed to be open horizontally.

Additionally, in the embodiments, the invention is described as being applied to the article storage portion which is disposed in the space defined between the front cover and the rear cover, the invention is not limited thereto. Hence, the invention may be applied to an article storage portion which is disposed in any location, as long as the article storage portion is disposed inside the cover members. In addition, in the embodiments, while the rotary damper 50 is provided at the one end portion 31be of the lid member 31, the one end portion 31be and the other end portion 31bf are replaced with each other, so that the rotary damper 50 and the rotary damper mounting structure may be provided on the left-hand side of the vehicle.

DESCRIPTION OF REFERENCE NUMERALS AND CHARACTERS

1 Automatic two-wheeled vehicle
10 Body frame
12 Mounting seat
15 Head pipe
20 Cover member
20f Front cover
20i Inner panel
20u Outer panel
20r Rear cover
20ig Support groove
20ih Bearing hole
30 Article storage portion
30a Opening portion
30s Storage space
31, 31A Lid member
31b Pivot
31be One end portion
31bf The other end portion
31s External surface
31i Inner lid portion
31u Outer lid portion
50 Rotary damper
50a Main body portion
50b Damper operating portion
50d Rotation preventive projection
60, 70 Fastening stay
C Rotational axis
RS Ride-on-space

The invention claimed is:

1. An article storage structure for an automatic two-wheeled vehicle, comprising:
   a cover member which covers a vehicle external side;
   an article storage portion which is disposed inside the cover member and enables to store an article;
   a lid member which opens or closes an opening portion of the article storage portion;
   a pivot which is provided in the lid member, which defines a rotational axis along an external surface of the lid member, and which is formed to project laterally from the lid member; and
   a rotary damper which is provided on the rotational axis and on a side of the pivot, and which is engaged with one end portion of the pivot so as to dampen a rotation of the lid member,
   wherein the lid member opens by means of its own weight
   a ride-on-space is defined between a rear cover covering a rear surface side of a head pipe at a vehicle front portion and a mounting seat,
   the rear cover includes an outer panel situated on an outer side of a vehicle body and an inner panel situated on an inner side of the outer panel, the outer panel and the inner panel being superposed one on the other, one end portion of the pivot and the rotary damper is held between the outer panel and the inner panel, a fastening stay fastening the pivot and the rotary damper together to the inner panel is provided, and the fastening stay is covered with the outer panel.

2. The article storage structure for the automatic two-wheeled vehicle (1) according to claim 1, wherein the rotary damper includes:

a substantially cylindrical main body portion extending along the rotational axis, a damper operating portion provided at one end of the main body portion and connected to the one end portion of the pivot, and a rotation preventive projection formed so as to project radially from an outer circumferential surface of the main body portion to thereby be locked on the cover member.

3. The article storage structure for the automatic two-wheeled vehicle according to claim 1, wherein a support groove is provided in the inner panel and is configured to support the pivot and the rotary damper so as to surround them.

4. The article storage structure for the automatic two-wheeled vehicle according to claim 3, wherein a bearing hole is provided on a side of the inner panel which is opposite to the side where the support groove is provided and is configured to support rotatably the other end portion of the pivot.

5. The article storage structure for the automatic two-wheeled vehicle according to claim 1, wherein the lid member includes an inner lid portion and an outer lid portion, the inner lid portion is formed more rigid than the outer lid portion, the pivot is provided on the inner lid portion.

* * * * *